Dec. 27, 1938.	G. D. PEET	2,141,875
METHOD OF MAKING AIR VAPOR MIXTURES
Filed June 9, 1936
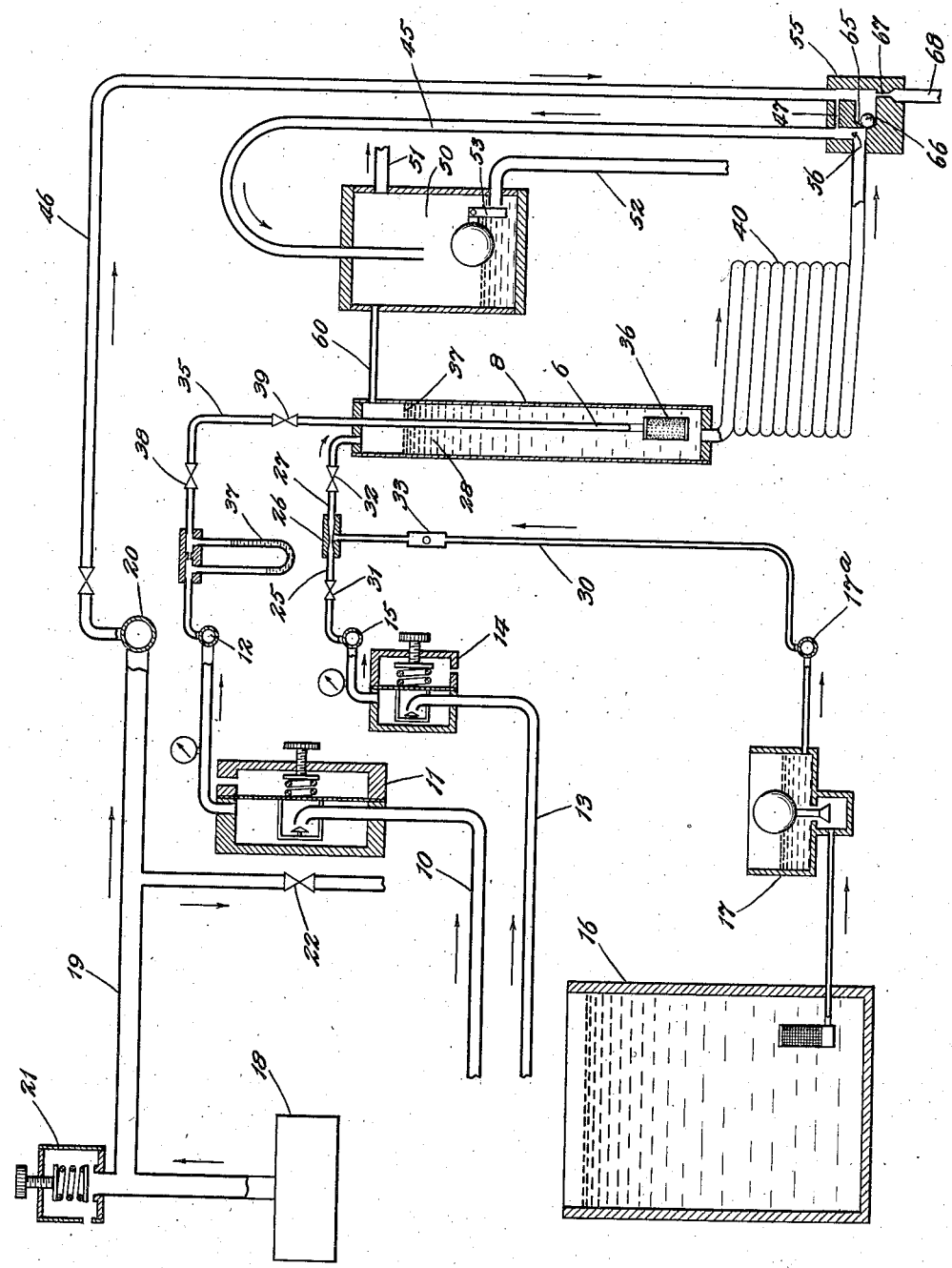
INVENTOR
Gerald D. Peet
BY
his ATTORNEY Patented Dec. 27, 1938

2,141,875

UNITED STATES PATENT OFFICE 2,141,875

METHOD OF MAKING AIR-VAPOR MIXTURES

Gerald D. Peet, Montclair, N. J., assignor to Wallace & Tiernan Products, Inc., Belleville, N. J., a corporation of New Jersey Application June 9, 1936, Serial No. 84,333

3 Claims. (Cl. 23—205)

This invention relates to a method for producing a continuous stream of air-vapor mixture of predetermined strength, and the invention aims generally to provide an improved method for producing such mixtures.

There are a number of volatile chemical substances useful in vapor form which can be much more readily or satisfactorily prepared in the form of a water solution than in the pure concentrated condition. Such substances include nitrogen trichloride and the more volatile of the substituted chloramines, such as, methyl dichloramine, $CH_3NCl_2$, ethyl dichloramine, $C_2H_5NCl_2$, and dimethyl chloramine, $(CH_3)_2NCl$. Mixtures of nitrogen trichloride vapor with air have been found to be very useful in the treatment of fruit, flour, and other articles, and the present invention has been made especially with the idea of providing an improved method and apparatus for producing mixtures of air and nitrogen trichloride vapor.

It will be understood that, while the term "vapor" is ordinarily applied to the gaseous form of substances having a boiling point above ordinary room temperatures, the term is used here to include the gaseous form of substances having a lower boiling point and which are, therefore, normally termed gases.

The complete method comprises the production of a stream of solution of the substance to be vaporized to form the air-vapor mixture, and more especially of nitrogen trichloride, of substantially constant strength and constant rate of flow; and the production of the desired air-vapor mixture of substantially constant concentration and constant rate of flow by the vaporization of the nitrogen trichloride or other substance into an air stream flowing at a predetermined rate.

An important feature of the invention relates to the bringing of the nitrogen trichloride or other solution into intimate contact with the air to permit the latter to take up the nitrogen trichloride, etc., from the solution, and involves the filming out of the solution on the walls of a tube and at the same time producing a small amount of fine spray by means of a high velocity stream of air passed through the tube.

I have found that, if water and air are introduced simultaneously into the lower end of a relatively small diameter tube, the result depends on the relative rate at which the water and air are introduced. If the volumes are equal or the volume of water exceeds that of the air, alternate slugs of water and air pass up the tube. That is the principle on which the ordinary airlift pump operates. As the volume of air is increased relatively to the water, the length of the slugs of air increases and that of the slugs of water decreases until finally the slugs of water disappear. When that point is reached, water will be carried up the tube partly as spray but mostly as a film on the tube wall. The production of a climbing film depends upon whether the rate of flow of air is high enough to create sufficient friction to draw such film of water up the tube wall.

In practice, I have found that a flow of 10 cu. ft. of air per minute through a 3/4" bore tube is sufficiently rapid to draw 1/2 gal. of water up the tube, chiefly in the form of a climbing film on the tube wall.

Half a gallon of solution has a volume of about 0.067 cu. ft., so that the ratio of the volume of air to solution in the above case is about 150:1. While the volume of air relative to that of the solution may be much less than that just stated, it should in order to have the desired film action be kept above a 75:1 ratio. On the other hand, the relative volume of air may be very considerably greater than in the example given. Keeping the volume ratio of air to solution high, and the resulting filming and spraying of the solution, gives great air-solution surface relative to solution volume and thereby enables quick transfer of volatile matter from solution to air. Further, the stronger the solution the more readily it will give up its volatile content to the air.

The concentration of nitrogen trichloride required for the treatment of fruit, flour, etc., is low. Thus, a suitable concentration for treating fruit is about 0.05 gram per cubic foot of air. The mixture from the apparatus of this invention is desirably made of about ten times this concentration and diluted as used. To obtain an air-vapor mixture of such desired concentration with a solution-to-air ratio of 1/2 gal. to 10 cu. ft., the solution should contain around 0.3% $NCl_3$. It has been the practice heretofore to make solutions of nitrogen trichloride much more dilute than 0.3%, so that such a solution is, as compared with prior practice, relatively concentrated. To advantage the concentration of nitrogen trichloride should be at least above 0.05%.

Solutions of nitrogen trichloride are unstable and dangerous and should, therefore, be made as required for producing the air-vapor mixture, most desirably by introducing a controlled stream of chlorine into a controlled flow of solution of ammonium salt of suitable pH and containing somewhat more salt than is required to react with the chlorine to avoid the presence of free chlorine in the air nitrogen trichloride mixture. For example, a solution of nitrogen trichloride may be formed by passing chlorine gas into a solution of ammonium chloride having a pH less than 4.4. A concentrated solution of the ammonium salt is diluted with a larger volume of water before introducing the chlorine therein, by means of a water operated aspirator arranged to draw concentrated solution from a constant level tank or reservoir.

The drawing shows diagrammatically an apparatus adapted for practicing the method in the form now considered best for making air-nitrogen trichloride mixture.

The complete apparatus shown comprises means, which may be of any suitable kind, for supplying chlorine gas, water, concentrated solution of ammonium salt, and air, each under a constant pressure, and an apparatus for taking chlorine, water and ammonium salt solution and air from the supply means and producing a solution of nitrogen trichloride and then separating the nitrogen trichloride from the solution to produce the desired air-vapor mixture of the desired concentration at the desired rate. While the drawing shows only one solution and air-vapor mixture making apparatus, several such unit apparatus may be connected to and supplied from the same supply means.

Referring first to the supply means shown, chlorine gas from any suitable source under pressure is supplied through pipe 10 to a reducing valve 11 from which it passes at the desired pressure to a supply header 12. Water is supplied through pipe 13 from a source of supply under pressure in excess of that desired to a reducing valve 14 from which it flows at the desired pressure to a supply header 15. The solution of ammonium chloride is fed from a tank 16 to the float-controlled inlet of a constant level box 17. A blower 18 is shown as being the most desirable means for supplying the air at the desired pressure through pipe 19 to a supply header 20. An air relief valve 21 insures constancy of pressure, the blower operating to deliver just slightly more than the required pressure. An adjustable bleeder or trimming valve 22 in an outlet from the pipe 19 between the relief valve and the header may be provided to relieve the load on the relief valve and prevent frequent and noisy operation of the relief valve. The headers 12, 15 and 20 and the constant level box 17 are thus sources of supply under constant pressure of, respectively, chlorine gas, water, air and ammonium salt solution. The particular pressures under which the chlorine, water and air are supplied and the elevation of the constant level box 17 will depend on the capacity and details of design of the air-vapor mixture producing apparatus units. Chlorine pressure of about 10 lbs., water pressure of 11 lbs., and air pressure of 2½ lbs. have been found most suitable for apparatus units such as the one illustrated and hereinafter described. As stated, any suitable means may be used for providing the desired pressures. The required capacity of the supply means will of course depend on the number and capacity of the air-vapor mixture producing units.

Each of the several air-vapor mixture producing units to be used is connected to each of the supply headers 12, 15 and 20, and to the constant level box 17; and each unit can be controlled to produce the air-vapor mixture as desired for use, and one or more units started or shut off, without affecting or requiring any change in the setting of the other units. The several units may all be like the one shown in the drawing and which will now be described.

Connection to the water supply header 15 is made by a tube 25 to supply a water operated aspirator 26 which discharges through tube 27 into an absorption chamber 28. A tube 30 connected to the constant level box 17 extends upward to the throat of the aspirator so that by the suction of the aspirator ammonium chloride solution from the constant level box is drawn up against a constant negative head to enter and mix with the water passing through the aspirator, the mixture being discharged into the absorption chamber. There is a shut-off valve 31 in the tube 25, and a back pressure valve 32 in the tube 27 serves for adjusting the pulling capacity of the aspirator and, therefore, the rate at which the solution is sucked into the aspirator and the resulting concentration of the solution fed into the absorption chamber. The size and design of the aspirator determines the flow rate of water from the header 15. A sight flow indicator 33 is desirably provided in the tube 30.

The absorption chamber is most desirably provided by a vertically set tube of material resistant to a solution of chlorine and water, and preferably of glass for ease of observation, the solution inlet being at or near the top of the chamber and there being an outlet at the bottom. Chlorine gas from the chlorine supply header 12 flows through a tube 35 to a diffuser 36 near the bottom of the absorption chamber from which it is discharged in minute bubbles to be absorbed in the solution in the chamber. A manometer 37 connected across an orifice in the tube 35 shows the rate of flow of the chlorine, and a valve 38 serves for regulating the flow rate. A shut off valve 39 is also provided in the tube 35. The submergence of the diffuser should be such that no appreciable amount of free chlorine gas will escape from the surface of the solution in the absorption chamber.

Introducing the chlorine into the ammonium salt solution by means of a diffuser instead of using an aspirator is of advantage for the reason that it enables a stronger solution of nitrogen trichloride to be made. In the present apparatus, because of the large amount of air in proportion to the amount of nitrogen trichloride solution used in producing the air-vapor mixture, it is essential to have a solution of relatively high concentration.

The absorption tower or chamber 28 forms the upper part of a downcast through which the reacting mixture and the products of the reaction between the chlorine and ammonium salt pass continuously while the apparatus is in operation. The part of the downcast below the absorption chamber is, as shown, a flow passage 40 of relatively small diameter and of sufficient length to give the necessary time for completion of the reaction of the chlorine and the ammonium salt in the solution flowing through it. This reaction passage or chamber is conveniently formed by a suitable length of rubber hose.

The reaction chamber or passage might be formed by lengthening the absorption chamber tube 28 a sufficient distance below the diffuser 10 to give the requisite volume-to-flow relation to enable the reaction to be completed before discharge. It is preferable, however, in producing a solution of nitrogen trichloride to have a long, narrow reaction passage, as shown, to give a high liquid velocity and thereby reduce the possibility of stratification of the products of the reaction.

In the production of nitrogen trichloride in solution it is essential that there be no opportunity for the solution to stand in a quiescent state, as under this condition the nitrogen trichloride tends to separate out from the main body of the solution in pure concentrated liquid form, in which form it is highly explosive. Therefore, this apparatus has been designed so that, after the nitrogen trichloride is formed in solution, the solution moves continuously and passes only through ducts which are without traps or dead pockets where the solution may become quiescent.

The solution passes from the lower end of the reaction passage 40 into the lower end of a parallel flow transfer passage 45 in which the solution is carried upward by and brought into intimate contact with a high velocity current of air to effect separation of the nitrogen trichloride from the solution into the air current. Air under pressure is supplied to the lower end of the passage 45 from the air header 20 through a tube 46, the air entering the passage 45 through a restricted inlet passage or port 47. The passage, or upcast, 45 is provided by a tube which most desirably extends vertically upward and has at its upper end a return bend, the end of the tube extending downward into a separating chamber 50 into which the mixture of air and nitrogen trichloride vapor and the spent solution are discharged. The air-vapor mixture passes from the chamber 50 through a tube 51 to the place of use, and the spent solution drains off through a waste tube 52 the entrance to which is controlled by a float-controlled valve 53 so that water will be retained in the bottom of the separating chamber to seal the outlet to the tube 52.

In the arrangement shown, the tubes 45 and 46 are connected at their lower ends to a block 55 which has in it a passage forming the lower end of the upcast passage, a passage forming a continuation of the air tube 46, the air inlet port 47 and the solution inlet port 56. The air inlet port 47 is most desirably, and as shown, although not necessarily, located a short distance above the solution inlet port 56.

In order to avoid the building up of pressure in the upper part of the absorption chamber 28 and to avoid unbalancing of the system which would otherwise result from variation in back pressure on the air-vapor mixture outlet 51, a pressure equalizing tube 60 is provided between the upper end of the absorption chamber and an upper part of the separating chamber 50.

The apparatus is so designed and operated that the pressure drop in the upcast between the air inlet port 47 and the point of discharge into the separating chamber 50 is slightly less than the hydraulic head in the downcast, that is, in the absorption chamber and reaction passage, so that the solution under such hydraulic head will rise in the passage 45 slightly above the air inlet port 47 against the air pressure in the passage, where it can be seized and carried upwardly by the air. Because of the relatively large volume of air entering and flowing upward through the passage 45 the smaller volume of solution is filmed out against the wall of the passage and so carried along up through the tube with some of the liquid spraying off into the flowing air. Very efficient separation of the nitrogen trichloride from the solution is thus secured.

The level of solution in the absorption tower is controlled by various factors, including the rate of flow of ammonium salt solution into the chamber, the air pressure maintained in the lower part of the parallel flow passage 45, and the relative elevation of the passage 45. The hydraulic head developed by the level of the solution in the absorption chamber and the rate of feed of solution into the absorption chamber must be such that the solution will feed out of the chamber as fast as it is fed in, and that it will overcome the friction loss in the system. The parallel flow passage 45 must be of such small size as to secure the desired filming-out and upward movement of the solution under the adjusted air flow, and of sufficient length to afford the necessary contact and time for volatilization and separation of the nitrogen trichloride from the solution and to cause a pressure drop such that the pressure in the lower end of the passage may be sufficient to balance the hydraulic head in the downcast side of the apparatus.

I have found that for an air-vapor mixture-producing unit for operating with a solution flow of ½ gallon per minute and an air flow of 10 cubic feet per minute and capable of producing up to about 400 grams of nitrogen trichloride in the air-vapor mixture per hour, suitable proportions of parts of the apparatus shown are as follows:— The absorption chamber 28—3 feet high and 3 inches in diameter, with its bottom about 2 feet above the connection of the lower end of the reaction chamber to the lower end of the tube 45, so that at that point, with the liquid level 6 inches from the top of the absorption chamber, there is a hydraulic head of 4½ feet; the reaction passage or chamber—20 feet long and 1 inch inside diameter; the parallel flow vaporizing passage, or upcast—¾ inch inside diameter and 7 feet long, including the return bend at the top; air inlet port or passage 47—about ⅝ inch long and $\tfrac{5}{16}$ inch diameter, to give a loss of head of about 12 inches water gauge and admit about 10 cubic feet of air per minute from the 2½ pounds pressure supply.

For reasons already explained, as soon as the apparatus is shut down or in case of air failure, the nitrogen trichloride solution should be drained out of the apparatus. For this purpose there is provided a port 65 between the extreme bottom of the passage 45 and the air supply passage in the block 55. A ball 66 closes this port during normal operation. The port is small enough so that there is a pressure drop therethrough sufficient to hold the ball seated. When the air supply is shut off, the ball falls away from its seat and the solution then drains from the reaction tube through the port 65 and thence through a small drain passage 67 to a waste pipe 68. A small flow of air passes to waste through the orifice 66 during operation. The apparatus will function without the ball check 66, but then the port 65 would have to be very small and there would be danger of stoppage.

What is claimed is:

1. The method of producing air-vapor mixtures containing only very small proportions of vapor, which comprises introducing a flow of solution of the vapor in a relatively non-volatile solvent into a high velocity current of air flowing upwardly along an imperforate passageway, the pressure and volume of air being sufficient to produce a continuous climbing film on the wall of such passageway carried along with the air, the ratio of rate of supply of the vapor in solution to the rate of supply of the air being far below that required to reach an equilibrium between the distribution of the vapor in the air and in the solution in order to permit the air to extract the greater part of the vapor from the solution, and then separating the vapor-laden air from the spent solution.

2. The method as claimed in claim 1 in which the solution of the vapor is an aqueous solution of nitrogen trichloride having a uniform concentration of nitrogen trichloride in excess of 0.05%.

3. The method as claimed in claim 1 in which the rates of flow of air and solution are in the volume ratio of over seventy-five of air to one of solution.

GERALD D. PEET.